United States Patent
Suh et al.

(10) Patent No.: US 10,394,724 B2
(45) Date of Patent: Aug. 27, 2019

(54) LOW POWER DATA TRANSFER FOR MEMORY SUBSYSTEM USING DATA PATTERN CHECKER TO DETERMINE WHEN TO SUPPRESS TRANSFERS BASED ON SPECIFIC PATTERNS

(71) Applicant: QUALCOMM Incorporated, San Diego, CA (US)

(72) Inventors: Jungwon Suh, San Diego, CA (US); Dexter Chun, San Diego, CA (US); Haw-Jing Lo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 15/243,435

(22) Filed: Aug. 22, 2016

(65) Prior Publication Data
US 2018/0052785 A1    Feb. 22, 2018

(51) Int. Cl.
G06F 13/00    (2006.01)
G06F 13/16    (2006.01)

(52) U.S. Cl.
CPC ...... *G06F 13/1668* (2013.01); *G06F 13/1673* (2013.01); *Y02D 10/14* (2018.01)

(58) Field of Classification Search
CPC .................................................. G06F 13/1668
See application file for complete search history.

(56) References Cited

U.S. PATENT DOCUMENTS

| | | | |
|---|---|---|---|
| 6,009,026 A * | 12/1999 | Tamlyn | G11C 7/10 365/189.07 |
| 7,934,029 B2 | 4/2011 | Chaussade | |
| 7,996,642 B1 | 8/2011 | Smith | |
| 8,688,891 B2 * | 4/2014 | Seo | G06F 13/1673 711/154 |
| 9,280,287 B2 | 3/2016 | Seo et al. | |
| 9,880,952 B2 * | 1/2018 | Azuma | G06F 13/1642 |
| 10,222,853 B2 * | 3/2019 | Suh | G06F 13/1673 |
| 2007/0124539 A1 * | 5/2007 | Mandler | G06F 13/1668 711/128 |
| 2015/0026413 A1 | 1/2015 | Meier et al. | |
| 2015/0186282 A1 | 7/2015 | Rahme et al. | |

OTHER PUBLICATIONS

International Search Report and Written Opinion—PCT/US2017/039636—ISA/EPO—dated Sep. 29, 2017.

* cited by examiner

*Primary Examiner* — Tammara R Peyton
(74) *Attorney, Agent, or Firm* — Muncy, Geissler, Olds & Lowe, P.C.

(57) ABSTRACT

Systems and method are directed to reducing power consumption of data transfer between a processor and a memory. A data to be transferred on a data bus between the processor and the memory is checked for a first data pattern, and if the first data pattern is present, transfer of the first data pattern is suppressed on the data bus. Instead, a first address corresponding to the first data pattern is transferred on a second bus between the processor and the memory. The first address is smaller than the first data pattern. The processor comprises a processor-side first-in-first-out (FIFO) and the memory comprises a memory-side FIFO, wherein the first data pattern is present at the first address in the processor-side FIFO and at the first address in the memory-side FIFO.

34 Claims, 15 Drawing Sheets

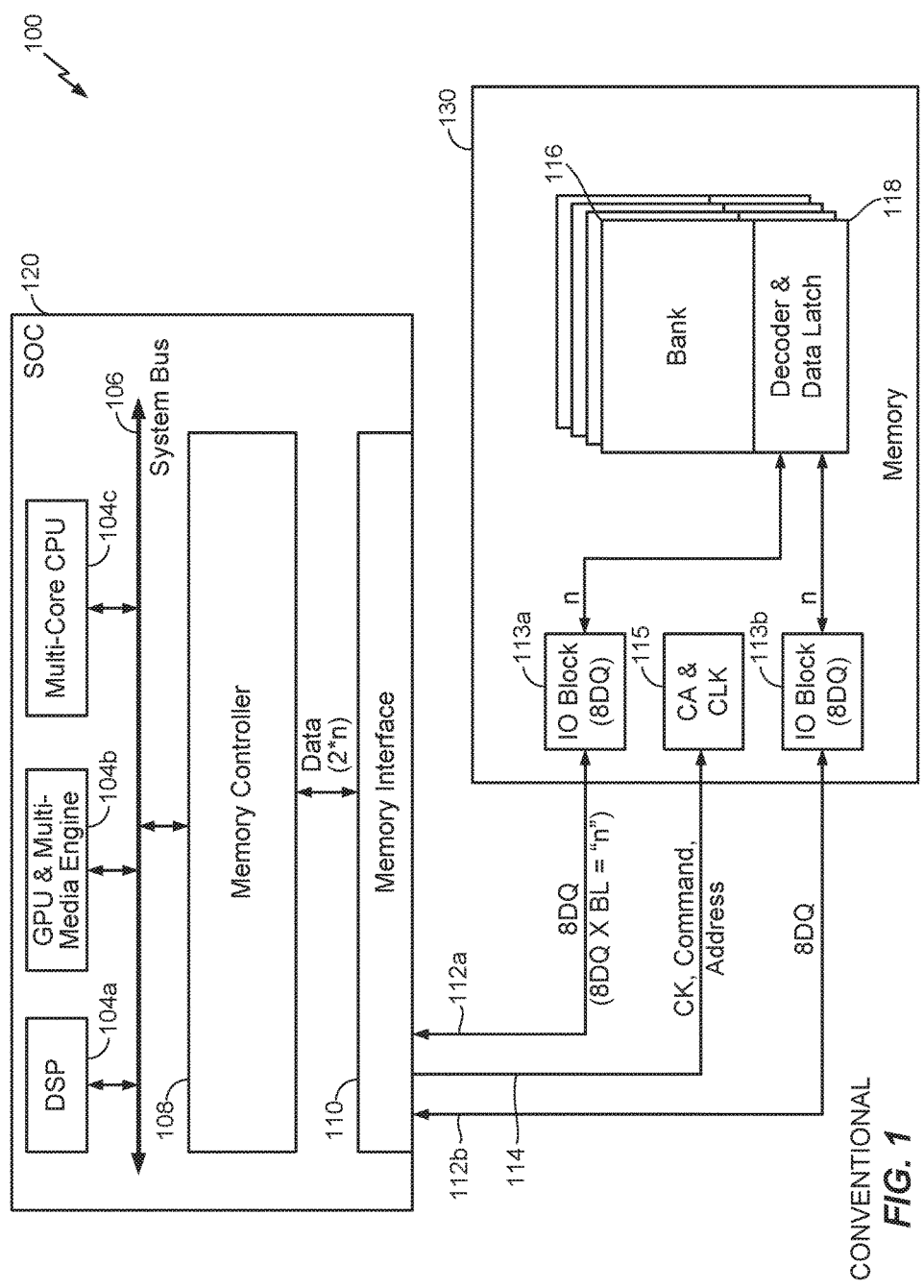
CONVENTIONAL
FIG. 1

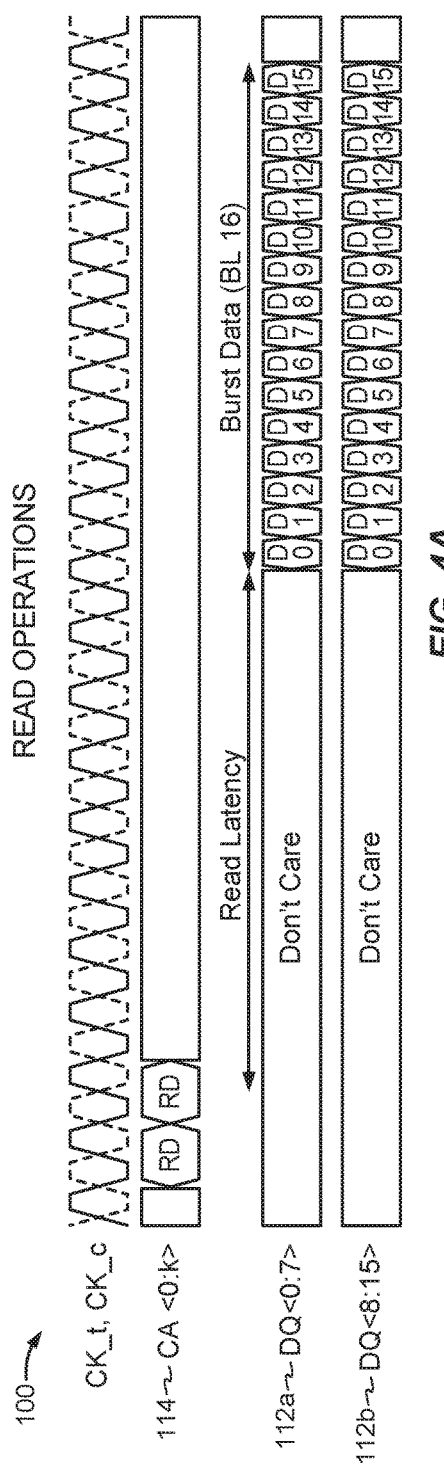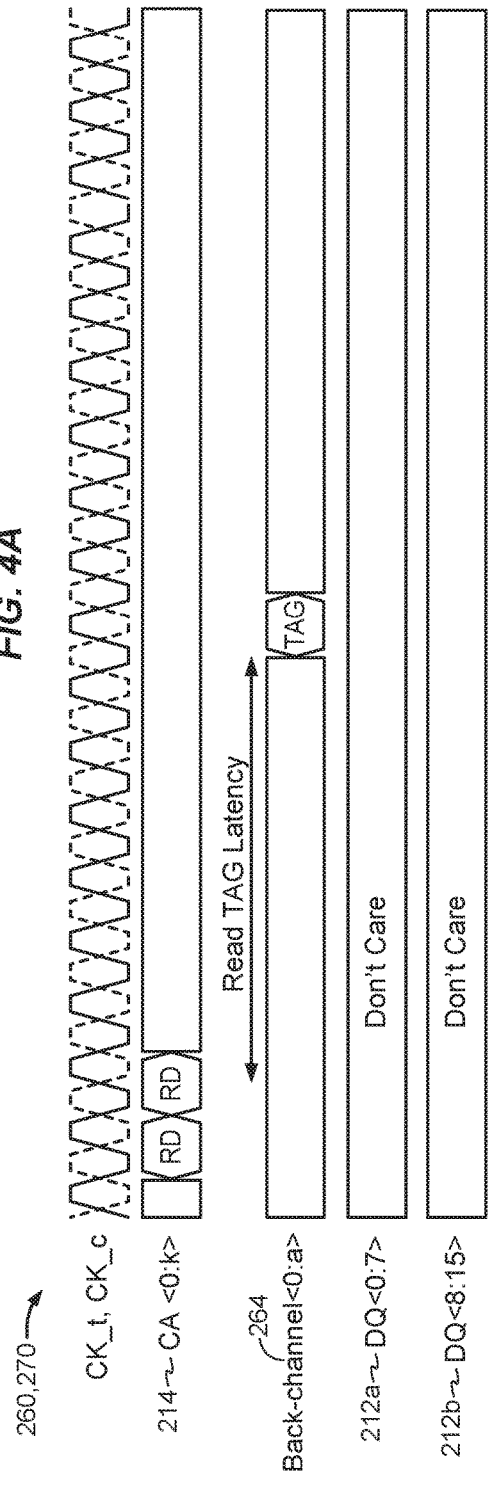

LOW POWER DATA TRANSFER FOR MEMORY SUBSYSTEM USING DATA PATTERN CHECKER TO DETERMINE WHEN TO SUPPRESS TRANSFERS BASED ON SPECIFIC PATTERNS

FIELD OF DISCLOSURE

Disclosed aspects are directed to processing systems. More particularly, exemplary aspects are directed to reducing power consumption of data transfer between a processing system and a memory subsystem.

BACKGROUND

Processing systems may include a backing storage location such as a memory subsystem comprising a main memory. For main memory implementations with large storage capacity, e.g., utilizing double-data rate (DDR) implementations of dynamic random access memory (DRAM) technology, the memory subsystem may be implemented off-chip, e.g., integrated on a memory chip which is different from a processor chip or system on chip (SoC) on which one or more processors which access the memory subsystem are integrated. Accordingly, accessing the main memory involves transporting data between the memory subsystem and the SoC, which has associated costs in terms of power consumption.

Power consumption in memory systems is a well-recognized challenge. Several techniques are known in the art for reducing power consumption in memory, such as voltage scaling. For example, the trend in voltage scaling is seen by considering the supply voltages specified for several generations or versions of low power DDR (LPDDR). The supply voltage VDD is 1.8V for LPDDR1; 1.2V for LPDDR2 and LPDDR3; 1.1V for LPDDR4. However, for future generations (e.g., LPDDR5, and beyond) the scope for further voltage scaling is limited, because if supply voltage continues to reduce, performance degradations may be observed due to limitations imposed by refresh operations and performance of memory peripheral input/output (IO) circuitry. Thus, any power efficiency gains which may be achieved by further voltage scaling may be offset by performance and quality degradations.

Accordingly, there is a need in the art for improving power efficiency of existing and future generations of memory subsystems, while avoiding drawbacks of conventional approaches such as voltage scaling.

SUMMARY

Exemplary aspects of the invention are directed to systems and method for reducing power consumption of data transfer between a processor and a memory. A data to be transferred on a data bus between the processor and the memory is checked for a first data pattern, and if the first data pattern is present, transfer of the first data pattern is suppressed on the data bus. Instead, a first address corresponding to the first data pattern is transferred on a second bus between the processor and the memory. The first address is smaller than the first data pattern. The processor comprises a processor-side first-in-first-out (FIFO) and the memory comprises a memory-side FIFO, wherein the first data pattern is present at the first address in the processor-side FIFO and at the first address in the memory-side FIFO.

For example, an exemplary aspect is directed to a method of communication in a processing system, the method comprising: determining that a data to be transferred on a data bus between a processor and a memory has a first data pattern, suppressing transfer of the first data pattern on the data bus, and transferring a first address corresponding to the first data pattern on a second bus between the processor and the memory.

Another exemplary aspect is directed to an apparatus comprising a processor, a memory, and a data bus between the processor and the memory. A data pattern checker is configured to determine that a data to be transferred on the data bus has a first data pattern and suppress transfer of the first data pattern on the data bus, and a second bus configured to transfer a first address corresponding to the first data pattern between the processor and the memory.

Yet another exemplary aspect is directed to an apparatus comprising means for determining that a data to be transferred on a data bus between a processor and a memory has a first data pattern, means for suppressing transfer of the first data pattern on the data bus, and means for transferring a first address corresponding to the first data pattern on a second bus between the processor and the memory.

Yet another exemplary aspect is directed to a processing system comprising a system on chip (SoC) comprising at least one processor, a storage memory package comprising at least one storage memory die, a storage memory link between the SoC and the storage memory package, a write data temporal pattern checker configured to determine that a data to be transferred on a transmission link of the storage memory link between the SoC and the storage memory package has a first data pattern and suppress transfer of the first data pattern on the transmission link, and a first storage memory interface of the SoC configured to transfer a first address corresponding to the first data pattern on the transmission link.

BRIEF DESCRIPTION OF THE DRAWINGS

The accompanying drawings are presented to aid in the description of aspects of the invention and are provided solely for illustration of the aspects and not limitation thereof.

FIG. 1 illustrates a conventional processing system.

FIGS. 3A-C and FIGS. 4A-C illustrate timing diagrams for processing systems configured according to exemplary aspects of this disclosure.

DETAILED DESCRIPTION

Figure 2A:
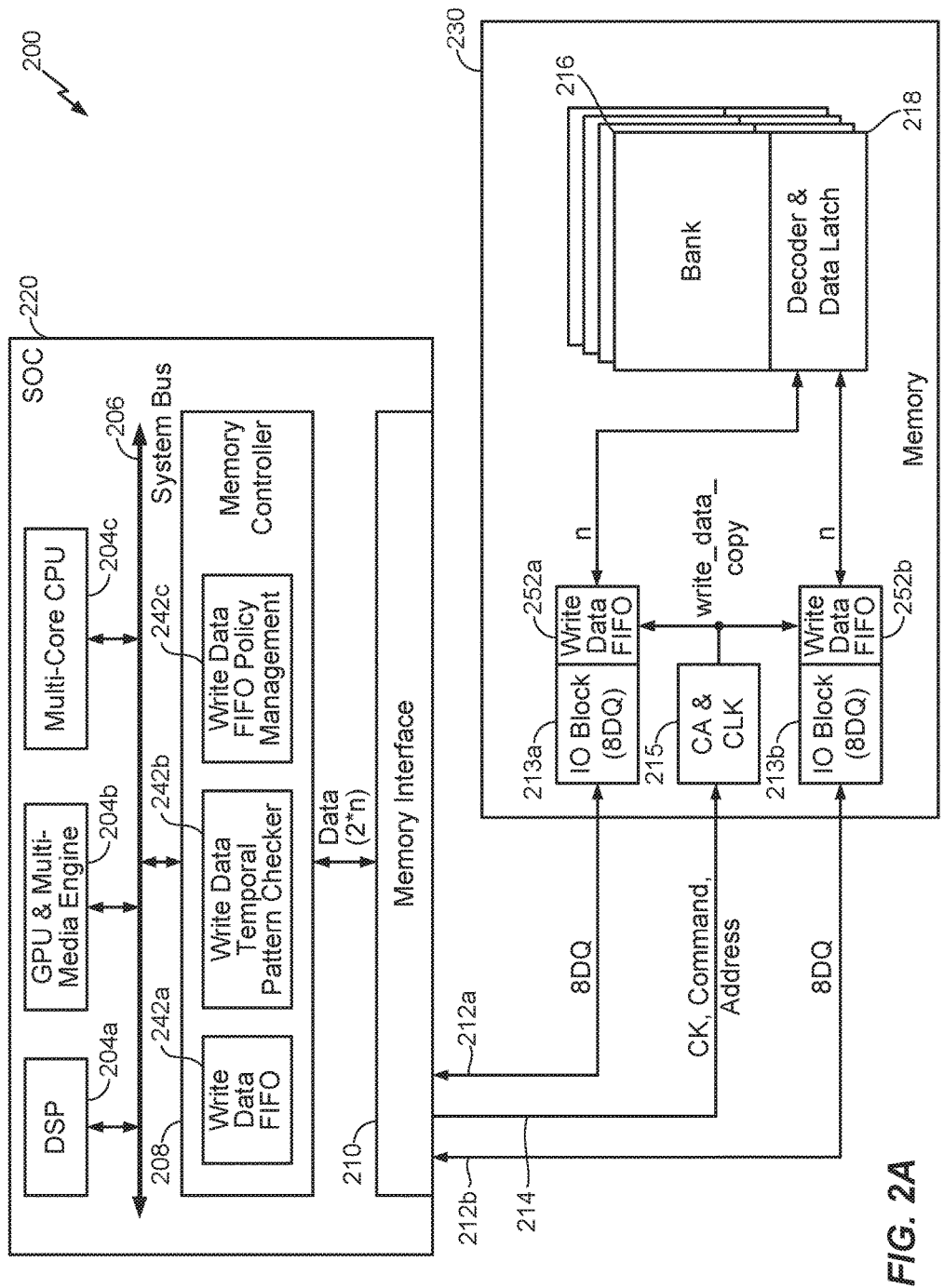
FIGS. 2A-E illustrate implementations of an exemplary processing system according to exemplary aspects of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to reducing memory power consumption in a processing system. It is recognized that power consumption in a memory subsystem increases with the amount of data transferred to and from the memory subsystem. Thus, the data traffic is reduced to reduce power consumption in exemplary aspects. For example, there may be repeated data patterns transmitted back and forth on data buses between an SoC and a memory subsystem. Such repeated data patterns may be identified and stored in one or more buffers located in the SoC and the memory subsystem. When a repeated data pattern stored in a buffer is to be transferred on a data bus, only an address related to the data pattern may be sent and transfer of the data pattern itself may be suppressed. In exemplary aspects, the address consumes less bandwidth than the data pattern itself, and so the data traffic is reduced, thus reducing power consumption. These and related aspects are further explained with reference to the figures below.

In FIG. 1, a conventional processing system 100 is illustrated with SoC 120 and memory subsystem 130. SoC 120 can comprise one or more processing elements of which, for the sake of an exemplary illustration, processing elements 104a-c are representatively shown as digital signal processor (DSP) 104a, a general purpose processor (GPU) and multimedia engine 104c, multi-core central processing unit (CPU) 104c, etc. Processing elements 104a-c may be connected to memory controller 108 through an interface such as system bus 106. Processing elements 104a-c may make requests for accessing one or more banks 116 of memory in memory subsystem 130, and memory controller 108 controls these access requests. For example, memory controller 108 may implement queuing mechanisms, arbitration techniques, etc., to selectively allow one or more requests received from processing elements 104a-c to access memory subsystem 130 based on available bandwidth. For the sake of simplicity, one or more levels of caches that may be present between processing elements 104a-c and memory controller 108 are not shown, but caches may be implemented according to conventional techniques without affecting the scope of this disclosure.

Memory access of memory subsystem 130 from SoC 120 may involve memory interface 110 (e.g., input/output pins or other related interface) integrated on SoC 120, connected to various buses. In one arrangement, buses 112a-b are shown as two-way or bidirectional data buses, while bus 114 is shown as a command bus which can carry addresses, clocks, etc.

For a data write or store operation, data to be written to any of memory banks 116 is provided by one of processing elements 104a-c, for example, and once memory controller 108 approves the write operation, the data is carried on one or both of buses 112a-b from memory interface 110 of SoC 120 to be received at one or more 10 blocks 113a-b, correspondingly, of memory subsystem 130. The command (C), address (A), and clock (CLK) for the data write operation is supplied on bus 114 to be received by CA and CLK block 115. From IO blocks 113a-b, the data is transferred to decoder and data latch 118, from which the data is transferred to the address (received from block 115) at which the data is to be written into the appropriate memory bank 116.

For a data read or load operation, following a read request from one of processing elements 104a-c being granted access to memory subsystem 130 by memory controller 108, the read request, read address, and clock may be supplied on bus 114, received at block 115 of memory subsystem 130, and with the use of block 118, corresponding data from the read address may be read from one of memory banks 116, and supplied back through block 118 to one or more IO blocks 113a-b. From IO blocks 113a-b, the read data may be provided on buses 112a-b to memory interface 110 of SoC 120 and then eventually transferred to the requesting processing element 104a-c.

In both data write and read operations, as discussed above, buses 112a-b may carry data in blocks or unit sizes of n-bits (e.g., an 8 DQ times burst length of 16 or 128-bits). It is observed that in both directions of data transfer, i.e., for writes and reads on buses 112a-b, large portions of the data transferred comprise repeating patterns. For example, an uncompressed image data (e.g., used by processing elements 104a-c for image processing) may include large blocks of repeating bit patterns comprising all zeros or all ones. However, in conventional processing system 100 each occurrence of the repeated bit patterns is transferred as dictated by respective read/write commands, which leads to corresponding power consumption.

In exemplary aspects, it is recognized that transfer of repeated data patterns may be avoided, and instead indicators for the repeated data patterns, which may be of much smaller size or bit-width than the data patterns themselves, may be transferred instead to save power consumption. Exemplary techniques for determining that data to be transferred on a data bus between an SoC and a memory comprises a repeated data pattern and suppressing transfer of the repeated data pattern on the data bus are disclosed. The indicators for repeated data patterns may be supplied using one or more buffers or first in first out (FIFO) structures and transferring an address of an entry in a FIFO which comprises the repeated data pattern on a different bus between the SoC and the memory. Aspects of this disclosure will now be explained with reference to processing systems 200-280 shown in FIGS. 2A-E.

Figure 2B:
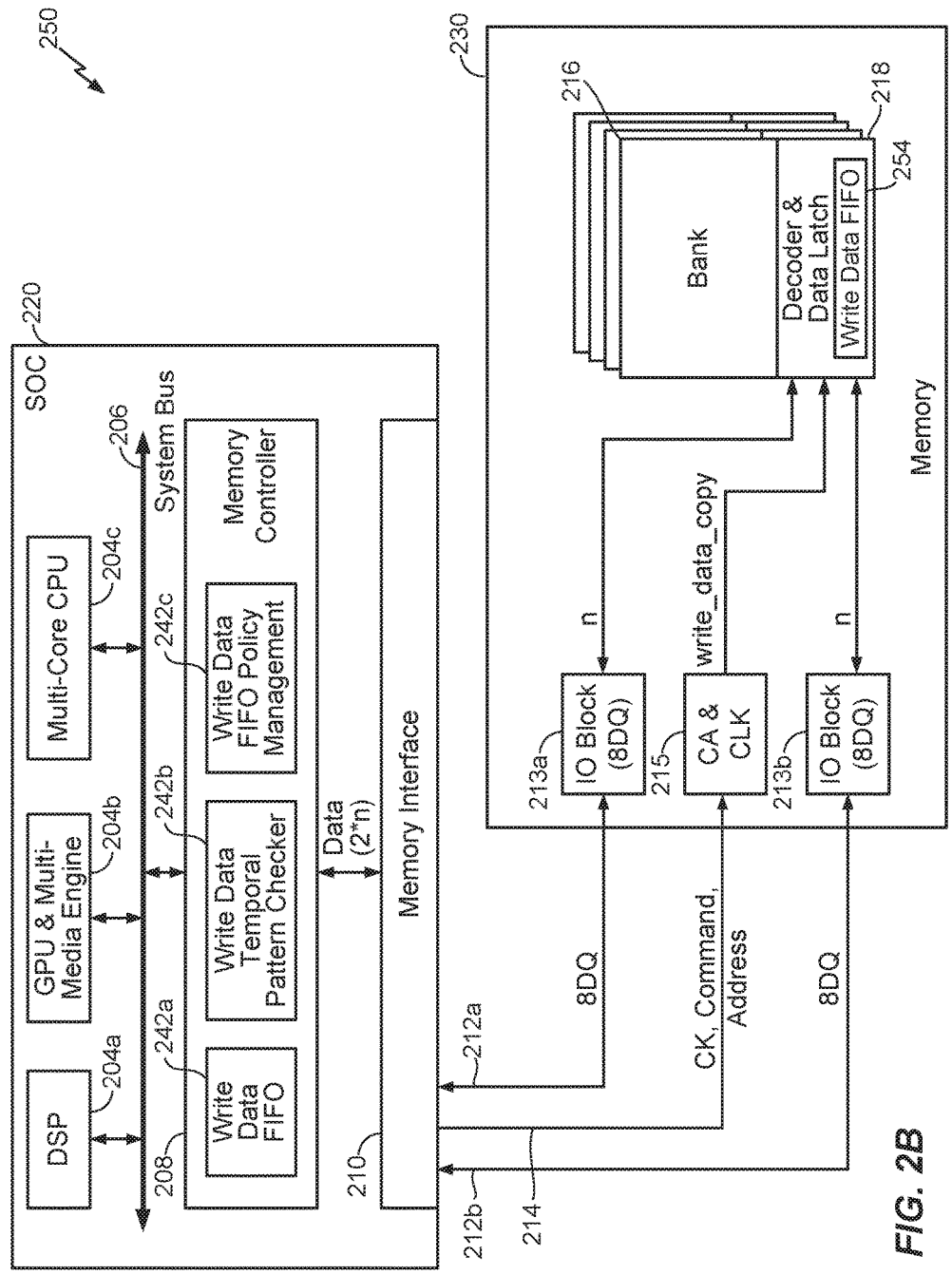
Figure 2C:
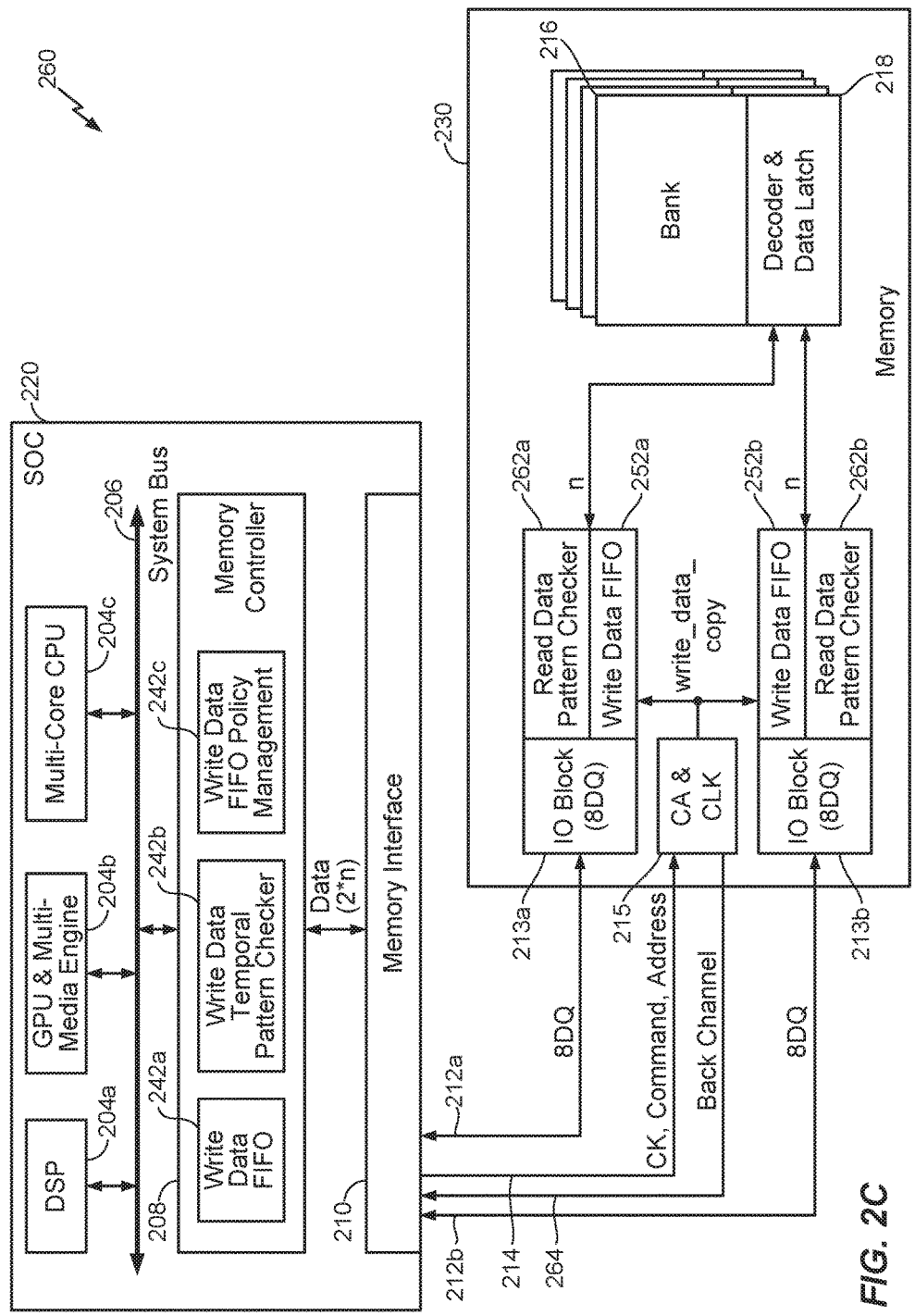
Figure 2D:
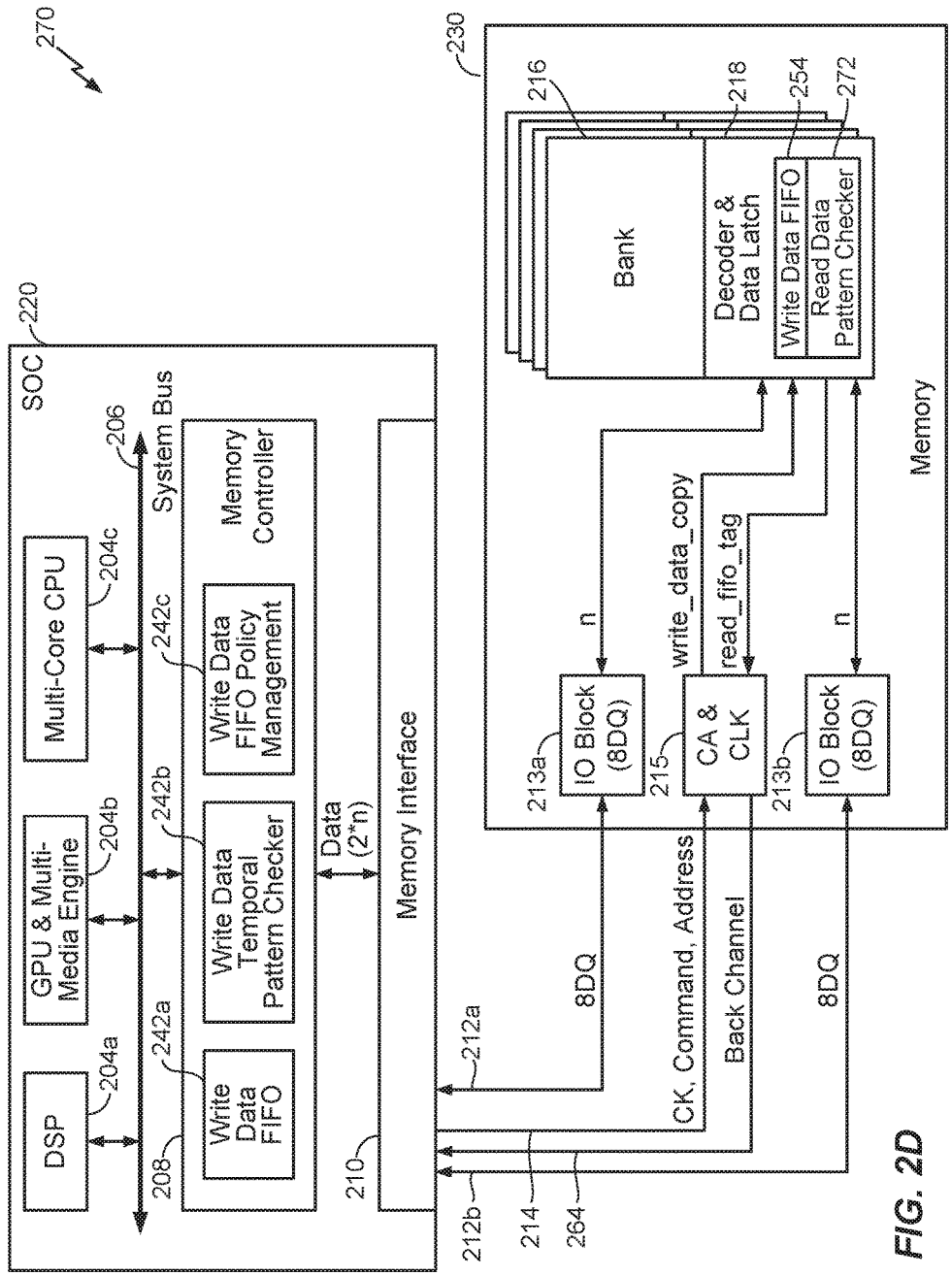
Figure 2E:
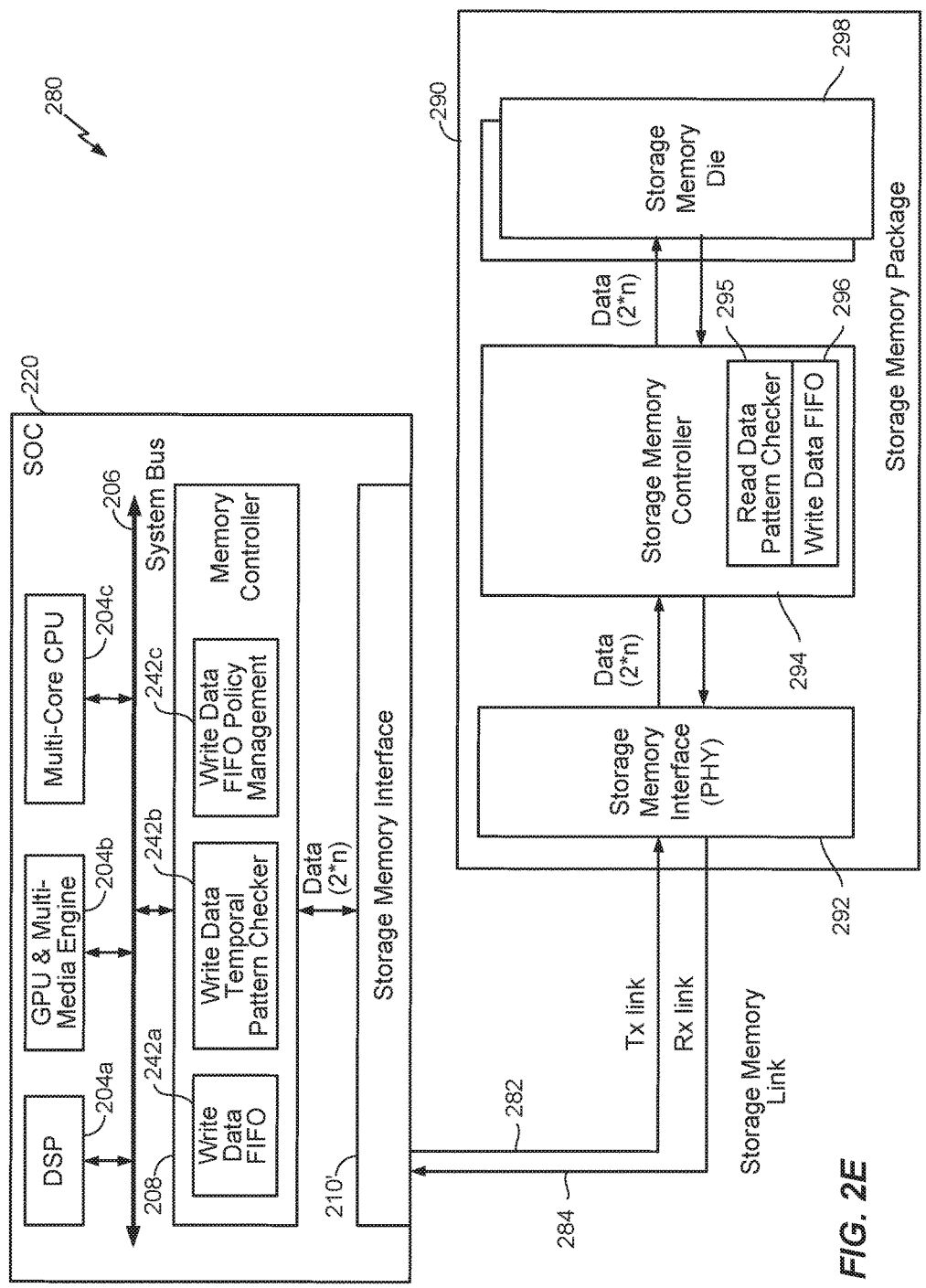

It will be understood that while terminologies related to some specific memory technologies may be used in the description of exemplary aspects in FIGS. 2A-E, this is merely for the sake of ease of explanation but not intended as a limitation of exemplary aspects to any specific memory technology. For example, FIGS. 2A-D illustrate configurations of memory subsystem 230 comprising memory banks 216 which may be designed according to any memory technology, including main memory technologies, such as technologies covered by Joint Electron Device Engineering Council (JEDEC) standards such as DRAM, synchronous DRAM (SDRAM), DDR3, DDR4, etc.), as well various generations of mobile memory technologies covered by JEDEC, including low power DDR (LPDDR) technologies such as LPDDR, LPDDR1, LPDDR2, LPDDR3, LPDDR4, LPDDR5, etc. Furthermore, as illustrated in FIG. 2E, exemplary aspects are also equally applicable to various other existing and future generations of Flash Memory technologies covered by JEDEC, e.g., Solid State Drives (SSD) memory, Universal Flash Storage (UFS), Embedded Multi Media Card (eMMC) etc.

Accordingly, with first reference to FIG. 2A an exemplary processing system 200 is illustrated. Processing system 200 has some similarities with processing system 100, and so an exhaustive repetition of similar aspects of processing systems 100 and 200 will be avoided for the sake of brevity. For example, in processing system 200, processing elements 204*a-b*, system bus 206, and memory interface 210 of SoC 220; buses 212*a-b* and 214; and IO blocks 213*a-b*, CA and CLK block 215, decoder and data latch 218 and memory banks 216 of memory subsystem 230 may be similarly configured as like components of processing system 100. Although referred to as SoC 220 and memory subsystem 230, these two components may be any processor and a memory, respectively, whether they are integrated on the same chip or on different chips (e.g., exemplary aspects are equally applicable to suppression of data transfer on any data bus between a processor and a memory).

Focusing on the distinctions from processing system 100, memory controller 208 of processing system 200 has additional features for reducing power consumption of data transfers between SoC 220 and memory subsystem 230, which will now be described. As shown, memory controller 208 includes blocks 242*a-c*, representatively shown as write data FIFO 242*a*, write data temporal pattern checker 242*b*, and write data FIFO policy management 242*c*. Further, memory subsystem 230 also comprises additional blocks shown as write data FIFOs 252*a-b*, example implementations of which will be discussed in further detail with reference to FIG. 5.

If any data traffic flowing through memory controller 208 has characteristics of data pattern repeatability over time, write data temporal pattern checker 242*b* is configured to detect whether a data pattern is repeated, e.g., matches a data pattern stored in write data FIFO 242*a*. Populating and updating data patterns stored in write data FIFO 242*a* repeated data patterns may be managed by write data FIFO policy management 242*c*. If a write data matches a data pattern stored in write data FIFO 242*a* at a particular FIFO address (also referred to as a tag), the tag of the matching (or hitting) entry of write data FIFO 242*a* is retrieved. The repeated data pattern is also stored at the same tag in write data FIFOs 252*a-b* of memory subsystem 230, which are shown to be in proximity to or in communication with IO blocks 213*a-b*, respectively. The two write data FIFOs 252*a-b* shown separately are merely one example implementation where each one of the two write data FIFOs 252*a-b* are one half the size of, and hold one half of a word of write data FIFO 242*a* (e.g., an upper half of a word comprising a repeated data pattern stored in a first address of write data FIFO 242*a* in memory controller 208 may be stored at the same, first address in write data FIFO 252*a* and the lower half of the word may be stored at the first address in write data FIFO 252*b*). In other implementations, the two write data FIFOs 252*a-b* may be replaced by a single write data FIFO of the same word size as write data FIFO 242*a*.

Accordingly, if a write data stream comprising write data is detected by write data temporal pattern checker 242*b* to have a matching write data pattern stored in write data FIFO 242*a*, then memory controller 208 (or any other logic or block of SoC 220) suppresses transfer of the write data pattern on buses 212*a-b*. Instead, memory controller 208 sends the tag at which the write data pattern is stored in write data FIFO 242*a* on bus 214. As will be discussed with reference to FIG. 5, the tag is of much smaller size (e.g., a few bits to point to hold an index of write data FIFO 242*a*) in comparison to the write data pattern which may be several magnitudes larger, for example, 128-bits.

At memory subsystem 230, block 215 receives the tag, along with related commands to indicate that the tag is for a repeated data pattern stored in write data FIFOs 252*a-b*, as well as the write address to which the repeated data pattern is to be written to in memory banks 216. The write data pattern is read out from the location pointed to by the tag in write data FIFOs 252*a-b* and transferred to the corresponding write address in memory banks 216 by use of decoder and data latch 218. In an example, the transfer of the write data pattern from write data FIFOs 252*a-b* to memory banks 216 may be performed using an internal signal or command such as a "write data copy" generated in memory subsystem 230 from the write address and the tag.

With reference now to FIG. 2B, an alternative aspect is illustrated in exemplary processing system 250, which is similar to processing system 200 in many aspects, as shown by the use of like reference numerals. Focusing on the differences from processing system 200, in processing system 250 replaces write data FIFOs 252*a-b* with write data FIFO 254, which is present in the decoder and data latch 218 block of each memory bank 116 (as shown, each memory bank 116 may have its own associated decoder and data latch 218). Power consumption of memory subsystem 230 is based on several components or factors such as IO interface power (e.g., consumed by IO blocks 213), internal bus power (e.g., consumed by for transferring data between IO blocks 213*a-b* to memory banks 216) and bank operation power (e.g., for reading/writing memory banks 216). By relocating write data FIFO 254 (e.g., from write data FIFOs 252*a-b* in proximity to IO blocks 213*a-b* in FIG. 2A to decoder and data latch 218 block of each memory bank 116), internal bus power consumption of memory subsystem 230 can be reduced. In contrast to FIG. 2A, where n-bit write data patterns are transferred from write data FIFOs 252*a-b* at IO blocks 213*a-b* to memory banks 216, in FIG. 2B, the n-bit write data pattern transfer from write data FIFOs 252*a-b* at IO blocks 213*a-b* to memory banks 216 may be avoided. Instead, an internal memory signal, such as "write data copy" which is generated from the write command and tag received by block 215 may be used to retrieve the write data pattern from write data FIFO 254 stored in decoder and data latch 218 and directly written to corresponding memory bank 216 with reduced significant power consumption.

With reference now to FIG. 2C, another alternative aspect is illustrated in exemplary processing system 250, which is also similar to processing system 200 in many aspects, as shown by the use of like reference numerals. Focusing on the differences from processing systems 200 and 250, processing system 260 includes techniques to suppress transfer of repeated data patterns for both read and write operations, e.g., on either direction of data transfer on buses 212a-b. It is understood that although illustrated in combination with aspects related to write operations, aspects of suppressing transfer of repeated read data patterns in processing system 260 may be included independently of aspects suppressing transfer of repeated write data patterns (e.g., in processing system 200). Suppressing transfer of repeated read data patterns can lead to memory power savings as follows. Accordingly, in processing system 260, memory subsystem 230 includes functional blocks illustrated as read data pattern check 262a-b, e.g., placed near or in close proximity to IO blocks 213a-b and configured to detect any repeated read data pattern, for example, a data pattern which has a matching entry in corresponding write data FIFOs 252a-b. If the data pattern for a read operation matches a data pattern stored in write data FIFOs 252a-b, then only a tag pointing to the entry where the matching data pattern is present in write data FIFOs 252a-b may be transferred, e.g., on back channel 264 which may be a separate bus or part of one of buses 212a-b from memory subsystem 230 to SoC 220. Corresponding read data is not transferred, e.g., on buses 212a-b from memory subsystem 230 to SoC 220. Upon receiving the tag on back channel 264, memory controller 208 in SoC 220 may read the data the corresponding data pattern from the entry of write data FIFO 242a pointed to by the tag. As previously mentioned, the remaining aspects for the write data path may be similarly configured as processing system 200, for example.

With reference now to FIG. 2D, yet another alternative aspect is illustrated in exemplary processing system 270, which is similar to processing system 250 of FIG. 2B in many aspects, as shown by the use of like reference numerals. Focusing on the differences from processing systems 200 and 250, like processing system 260 of FIG. 2C, processing system 270 of FIG. 2D also includes techniques to suppress transfer of repeated data patterns for both read and write operations, e.g., on either direction of data transfer on buses 212a-b, although once again, it is noted that aspects of suppressing transfer of repeated read data patterns in processing system 270 may be included independently of aspects suppressing transfer of repeated write data patterns (e.g., in processing system 250 in some cases). Suppressing transfer of repeated read data patterns can lead to further memory power savings, e.g., by further reducing the internal bus power of processing system 250 of FIG. 2B. In processing system 270, read data pattern checker 272 is placed along with write data FIFO 254 within decoder and data latch 218 of each memory bank 216. While, for example, in processing system 260 of FIG. 2C, an n-bit read data may have been internally transferred from memory banks 216 to read data pattern checkers 262a-b placed next to IO blocks 213a-b and write data FIFOs 252a-b to determine whether there is a match, on the other hand in processing system 270, this n-bit internal transfer may be avoided to save on the internal bus power in memory subsystem 230. Rather, data read out from memory banks 216 may be compared by read data pattern checker 272 with data patterns in write data FIFO 254 stored within decoder and data latch 218, and if there is a match, an internal signal bus, e.g., "read fifo tag<0:i>" can be generated for a tag entry comprising a matching data pattern in write data FIFO 254. The tag can be sent via back channel 264 which may be a bus from memory subsystem 230 to SoC 220. Corresponding read data is not transferred, e.g., on buses 212a-b from memory subsystem 230 to SoC 220. Upon receiving the tag on back channel 264, memory controller 208 in SoC 220 may read the data the corresponding data pattern from the entry of write data FIFO 242a pointed to by the tag. As previously mentioned, the remaining aspects for the write data path may be similarly configured as processing system 250, for example.

Referring to FIG. 2E, yet another alternative aspect is illustrated in exemplary processing system 280, which is similar to processing systems 200, 250, 260, and 270 discussed above with reference to FIGS. 2A-D, with some modifications to reflect possible changes which may be made to extend the exemplary features to any memory technology. Similar aspects of FIGS. 2A-D which have been retained in FIG. 2E have been shown with like reference numerals and an exhaustive explanation of the similar features will not be repeated, for the sake of brevity. Focusing on the differences from processing systems 200, 250, 260, and 270 of FIGS. 2A-D, respectively, in FIG. 2E, storage memory package 290 is shown instead of the previously discussed memory subsystem 230 in FIGS. 2A-D. Moreover, the data buses 212a-b, command buses 214, etc., of FIGS. 2A-D have been replaced correspondingly with a storage memory link comprising transmission (Tx) link 282 and reception (Rx) link 284. Corresponding changes may also be made to memory interface 210 of FIGS. 2A-D to accommodate the above modifications, and so memory interface 210 has been replaced with a first storage interface, shown as storage memory interface 210', which functions similarly as memory interface 210 of FIGS. 2A-D from the perspective of SoC 220, but manages data and control transfers to storage memory package 290 on Tx link 282 and receives data (and where applicable, back channel indications) on Rx link 284.

Considering storage memory package 290 in more detail, various memory technologies may be supported therein, e.g., existing and future generations of Flash Memory technologies covered by JEDEC, e.g., Solid State Drives (SSD) memory, Universal Flash Storage (UFS), Embedded Multi Media Card (eMMC) etc. For example, a read/write interface to storage memory package 290 may be provided by a physical (PHY) layer such as a second storage memory interface shown as storage memory interface 292. Received data from Tx link 282 or data to be transferred to Rx link 284 may be correspondingly provided to storage memory controller 294, which may comprise both read data pattern checker 295 (similar to read data pattern checker 272 of FIG. 2D, for example) as well as write data FIFO (similar to write data FIFO 254 of FIG. 2D, for example). Storage memory die 298 may comprise one or more memory arrays or banks (similar to memory banks 216 of FIG. 2D, for example).

Accordingly, in the case of a write, if a write data stream comprising write data is detected by write data temporal pattern checker 242b of SoC 220 to have a matching write data pattern (e.g., a first data pattern) stored in write data FIFO 242a, then storage memory interface 210' of SoC 220 (or any other logic or block of SoC 220) suppresses transfer of the write data pattern on Tx link 282. Instead, storage memory interface 210' sends the tag (e.g., a first address) at which the write data pattern is stored in write data FIFO 242a on Tx link 282. At storage memory package 290, storage memory interface 292 receives the tag, along with related commands to indicate that the tag is for a repeated data pattern stored in write data FIFO 296, as well as the write address to which the repeated data pattern is to be written to in storage memory die 298. The write data pattern is read out from the location pointed to by the tag in write data FIFO 296 and transferred to the corresponding write address in storage memory die 298. Accordingly, modifications which may be made to adapt the exemplary aspects to any memory technology will be understood by one skilled in the art, based at least on the example adaptation to processing system 280 of FIG. 2E described above.

In the case of a read, data read out from storage memory die 298 may be compared by read data pattern checker 295 with data patterns in write data FIFO 296, and if there is a match (e.g., for a second data pattern), a tag entry (e.g., a second address) comprising the matching data pattern in write data FIFO 296 can be sent through storage memory interface 292 and Rx link 284 to storage memory interface 210' of SoC 220. Corresponding read data is not transferred, e.g., on buses Rx link 284 from storage memory package 290 to SoC 220. Upon receiving the tag on Rx link 284, storage memory interface 210' in SoC 220 may read the data the corresponding data pattern from the entry of write data FIFO 242a of SoC 220 pointed to by the tag, as previously described with reference to FIGS. 2A-D.

With reference now to FIGS. 3-4, timing diagrams related to processing system 100 of FIG. 1 will be contrasted with timing diagrams related to processing systems 200-270 of FIGS. 2A-D to illustrate bus activity and related power savings in read and write operations according to exemplary aspects. A true and a complement version of clocks used for the various bus activities are shown as CK t and CK c, respectively.

Figure 3A:
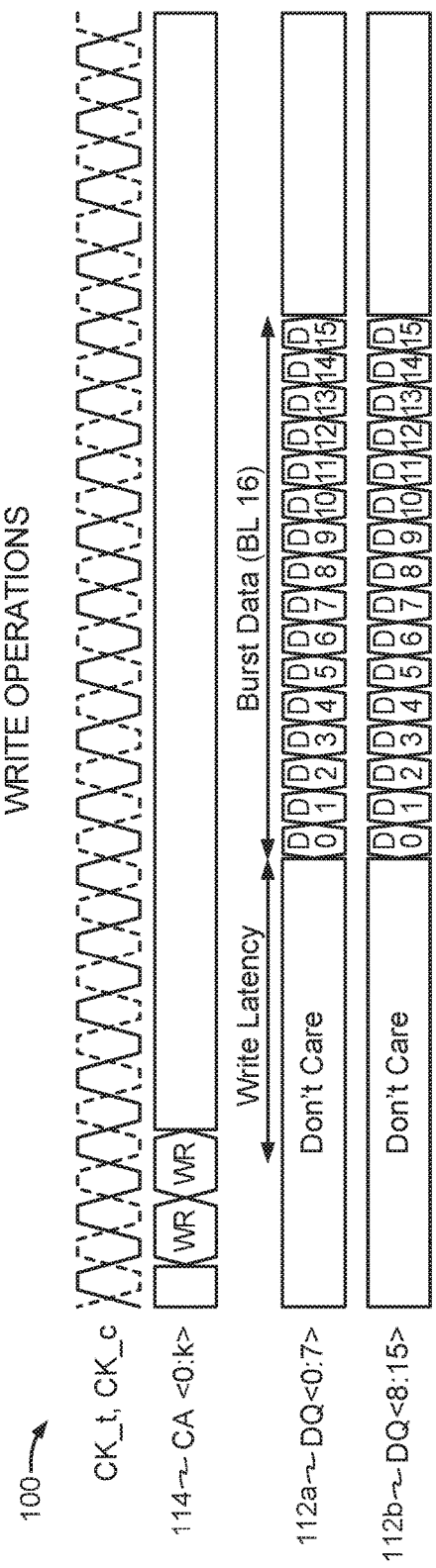
Figure 3A:
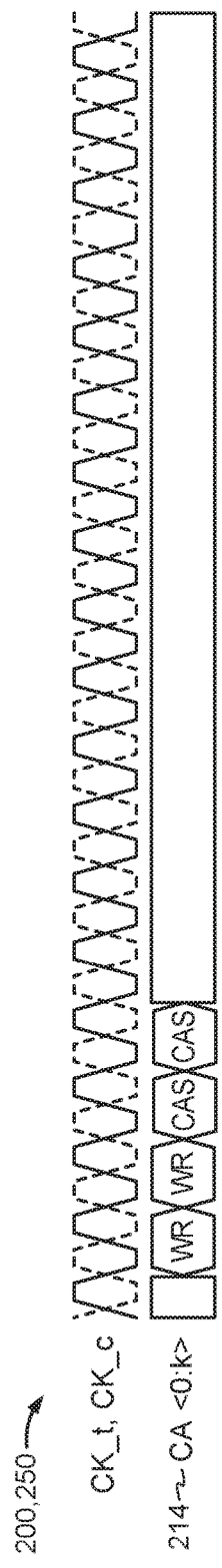
Figure 3B:
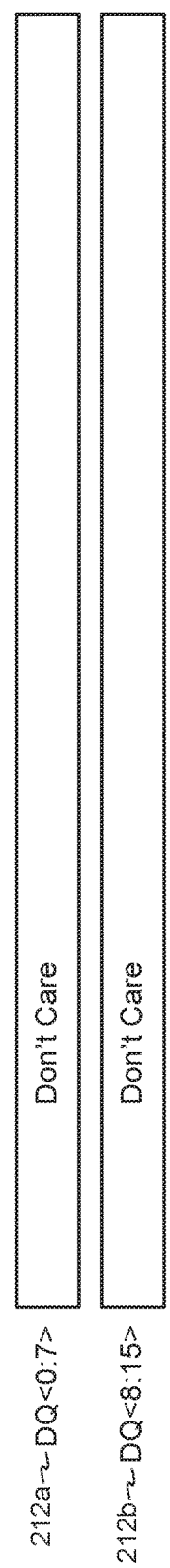
Figure 3C:
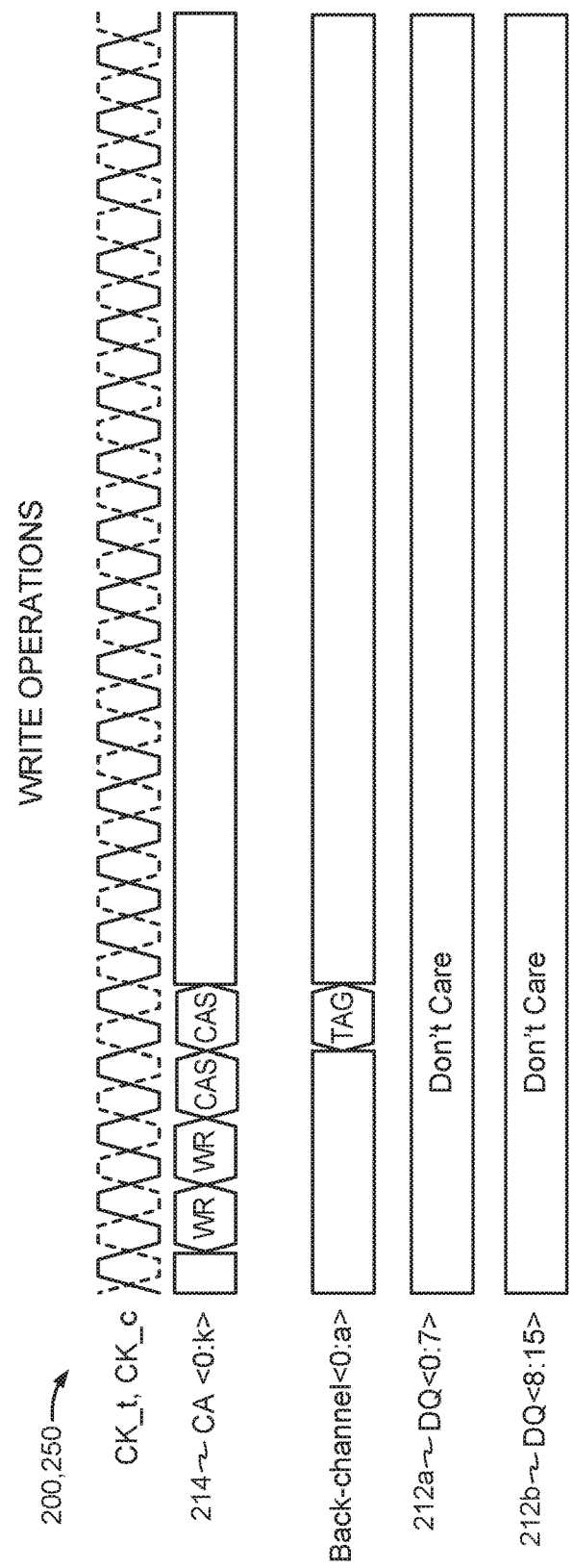

Considering FIGS. 3A-C, timing diagrams related to write operations are shown. In FIG. 3A, timing diagram of processing system 100 of FIG. 1 is shown, where for a write operation as indicated by a write command on bus 114, write data is sent from SoC 120 to memory subsystem 130, e.g., in a burst (after a corresponding latency) on data buses 112a-b (regardless of whether there are repeated data patterns). In contrast, considering FIG. 3B, a timing diagram pertaining to processing system 200 of FIG. 2A or processing system 250 of FIG. 2B is shown where the case of a repeated write data pattern is considered. As seen, the write address command as well as the tag address (e.g., of write data FIFO 242a, although not explicitly shown) is sent on bus 214, and there is no related data sent on buses 212a-b from SoC 220 to memory subsystem 230, i.e., the write data pattern transfer is suppressed. The corresponding write data is retrieved from respective write data FIFOs in memory subsystem 230, as discussed with reference to FIGS. 2A-B above. FIG. 3C shows an alternative to FIG. 3B where a back channel (not shown in FIGS. 2A-B) may also be used to transfer the tag, rather than send the tag on bus 214, while once again no related data sent on buses 212a-b. In one aspect, the back channel[a:0] may be a separate bus with a width representatively shown as comprising a+1 bits which may be used for the transfer of the tag.

Figure 4C:
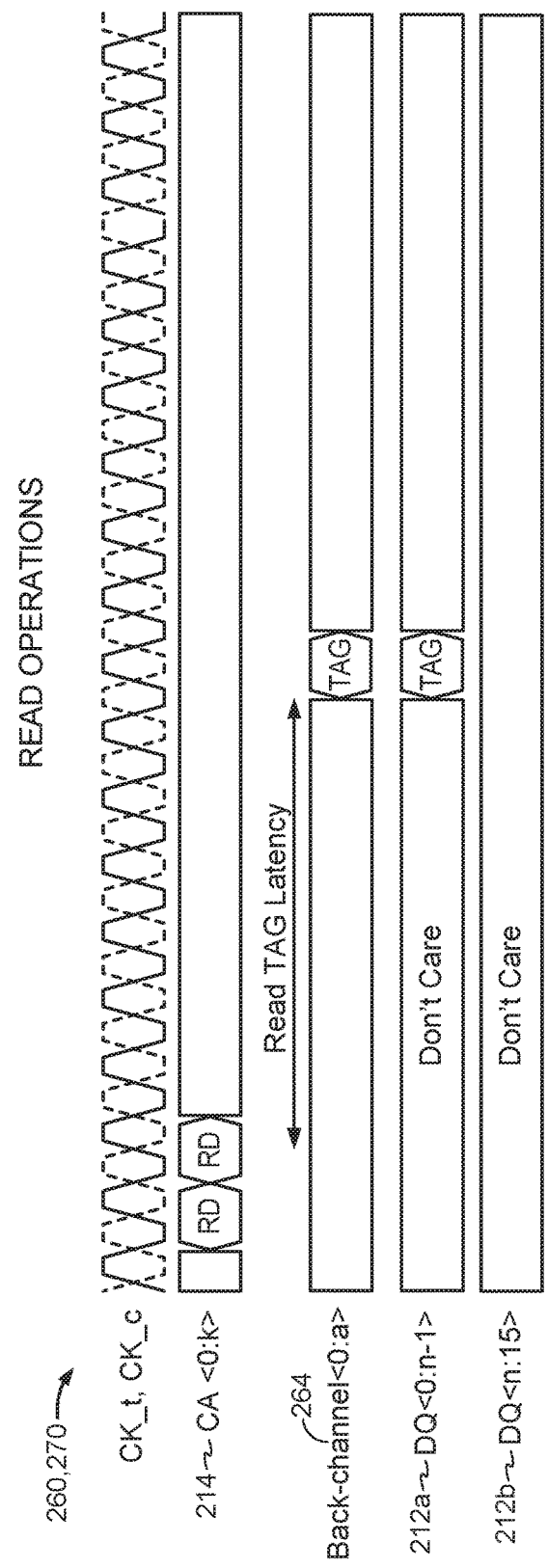

Considering FIGS. 4A-C, timing diagrams related to read operations are shown. In FIG. 4A, timing diagram of processing system 100 of FIG. 1 is shown, where for a read operation as indicated by a read command on bus 114, read data is sent from memory subsystem 130 to SoC 120, e.g., in a burst (after a corresponding latency) on data buses 112a-b (regardless of whether there are repeated data patterns). In contrast, considering FIG. 4B, a timing diagram pertaining to processing system 260 of FIG. 2C or processing system 270 of FIG. 2D is shown where the case of a repeated read data pattern is considered. As seen, the read address command is sent on bus 214 and related tag is sent on back channel 264, and there is no related data sent on buses 212a-b, i.e., the read data pattern transfer is suppressed. The corresponding read data is retrieved from respective write data FIFOs in memory controller 208, as discussed with reference to FIGS. 2C-D above. FIG. 4C shows an alternative to FIG. 4B where in addition to or as an alternative to back channel 264, a portion of one of data buses 212a-b (e.g., a portion of bus 212a) may also be used to transfer the tag, while once again no related data is sent on buses 212a-b.

Figure 5:
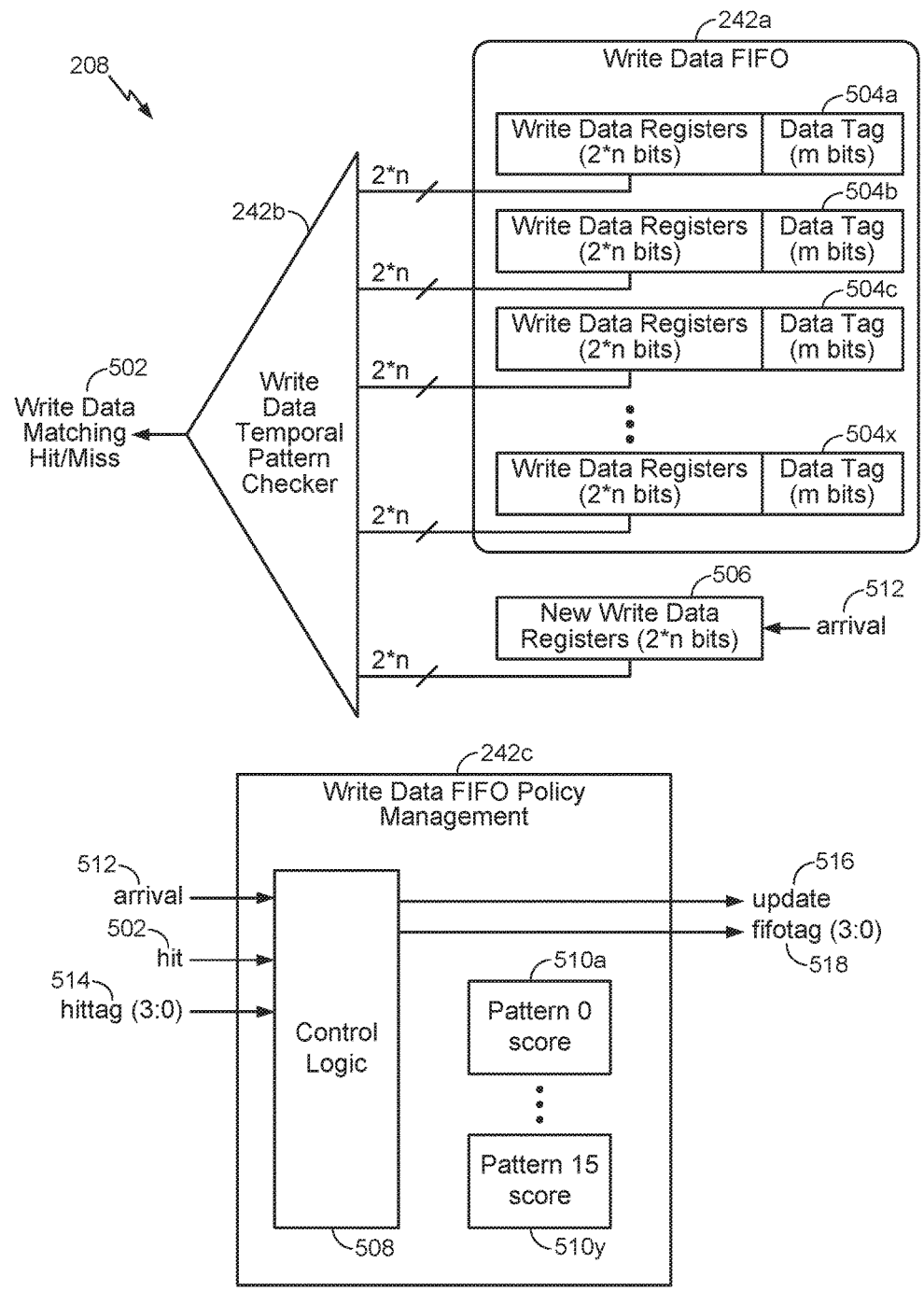
FIG. 5 illustrates a memory controller of a processing system configured according to exemplary aspects of this disclosure.

With reference now to FIG. 5, an exploded view of components of memory controller 208 of FIGS. 2A-D is shown according to one implementation. Write data FIFO 242a, write data temporal pattern checker 242b, and write data FIFO policy management 242c and are specifically shown in FIG. 5.

Write data FIFO 242a is shown to comprise a number (x) of entries representatively shown as 504a-x. Each entry has a data pattern, e.g., a 2*n-bit pattern corresponding to the combined width (2*n-bits) of data buses 212a-b, wherein the data pattern may each be stored in a 2*n-bit register of write data FIFO 242a. Correspondingly, each entry 504a-x also has an associated tag, which may be m-bits wide. In general m can be a function of the number of entries in write data FIFO 242a (e.g., m=log$_2$(x)) to point to an address or index in write data FIFO 242a where a particular data pattern is stored. Upon arrival 512 of a new 2*n-bit write data at memory controller 208, e.g., from one of processing elements 204a-c, the new write data is temporarily stored in register 506.

Write data temporal pattern checker 242b has logic to compare the value in register 506 with the values of data patterns stored in each of entries 504a-x. If there is a match with one of entries 504a-x, then hit 502 is generated. Correspondingly, if there is a hit, the m-bit tag corresponding to the matching entry 504a-x is also provided, which is sent as the tag on bus 214, rather than the 2*n-bits of write data stored in register 506. Since m-bits is far fewer than 2*n-bits, corresponding power savings are realized.

Write data FIFO policy management 242c is used to populate and update entries 504a-x of write data FIFO 242a in the following manner. Write data FIFO policy management 242c is shown to include control logic 508 and one or more fields 510a-y to hold pattern scores for entries 504a-x of write data FIFO 242a. An example where there are 16 pattern scores is considered for the sake of explanation. Following arrival 512 of new data as discussed above, if the new data generates hit 502, then the tag of the entry 504a-x which produced a hit is shown as hit tag[3:0] 514. Control logic 508 increments the score (which may be a saturating value) in a corresponding field 510a-x indexed by hit tag[3:0] 514. On the other hand, if hit 502 is not asserted, i.e., there is no match in any of entries 504a-x of write data FIFO 242a for the data stored in register 506, then one of entries 504a-x may be displaced to add the write data in register 506.

A least recently used policy may be used for replacing entries 504a-x by tracking the 16 highest scores in the above example, and replacing the entry 504a-x with the lowest score. Thus, if hit 502 is false (i.e., no match), then FIFO tag [3:0] 518 is generated for the pattern with the lowest score among the fields 510a-y. Entry 504a-x pointed to by FIFO tag [3:0] 518 is replaced with the new write data in register 506. In some aspects, some preselected data patterns may be locked in the sense they may remain static and irreplaceable in write data FIFO 242a (e.g., predetermined data patterns with all 2*n zeros and/or all 2*n ones may be locked data patterns which cannot be replaced).

Figure 6:
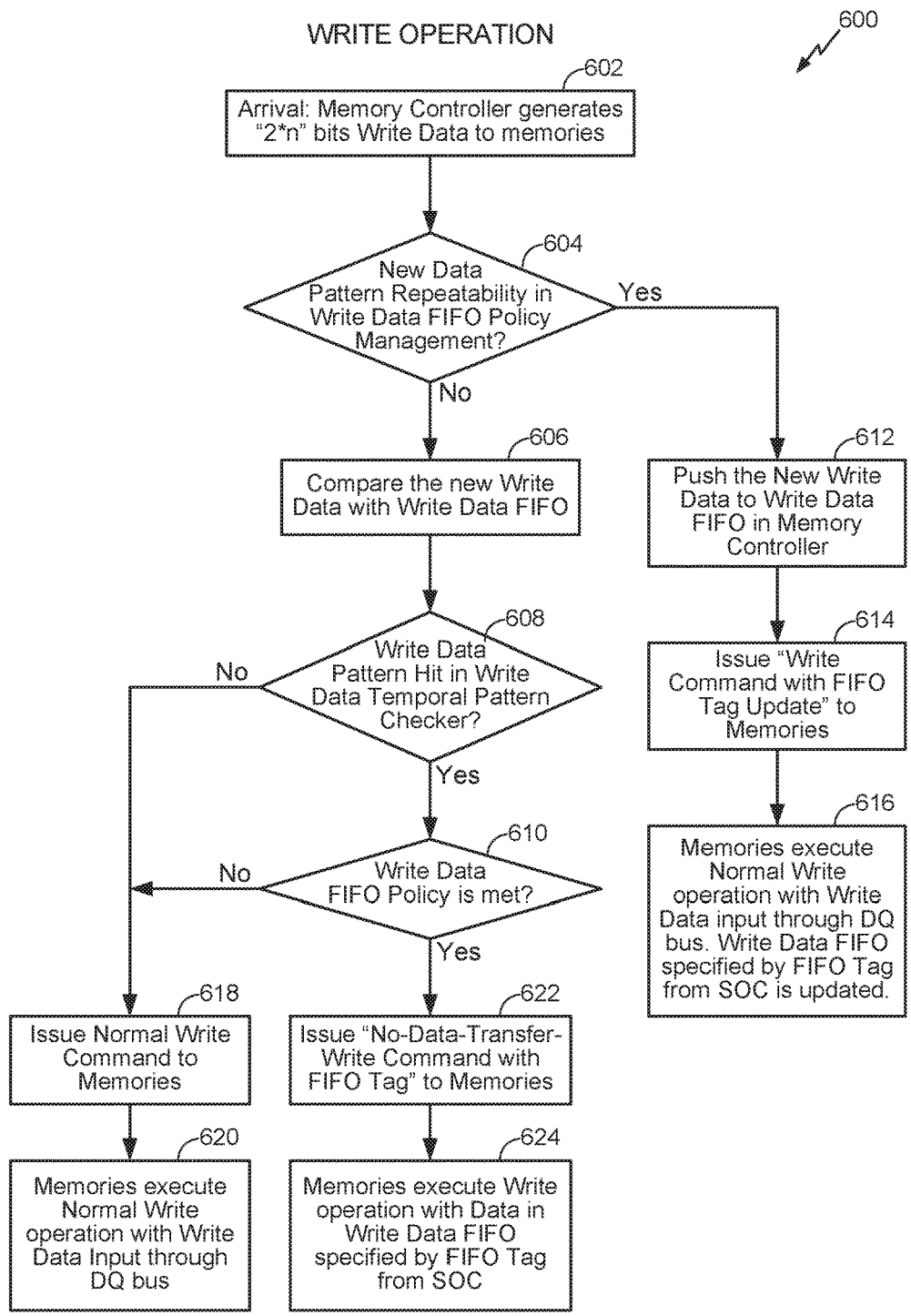
FIG. 6 illustrates a flow chart pertaining to a write operation according to exemplary aspects of this disclosure.
Figure 7:
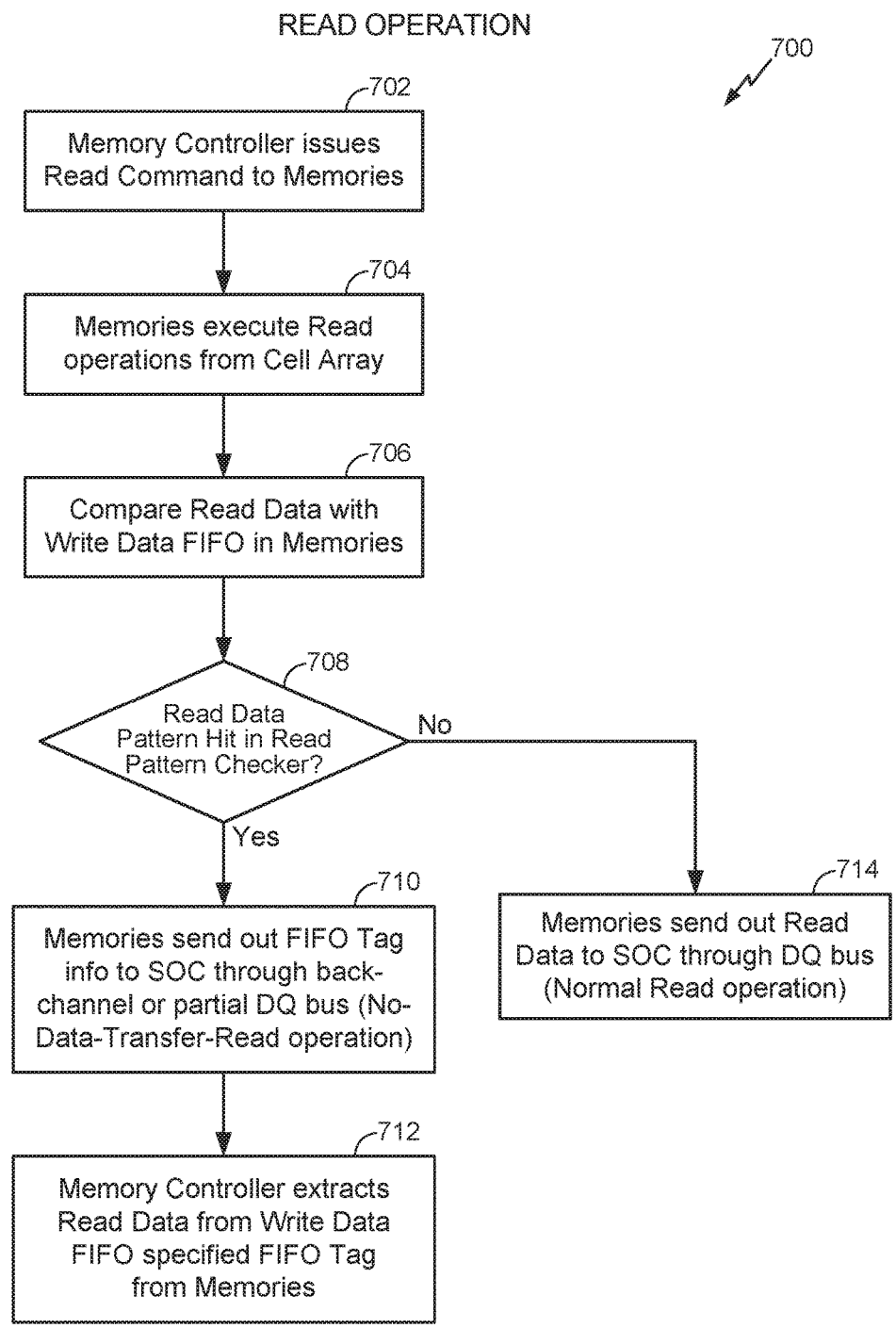
FIG. 7 illustrates a flow chart pertaining to a read operation according to exemplary aspects of this disclosure.
Figure 8:
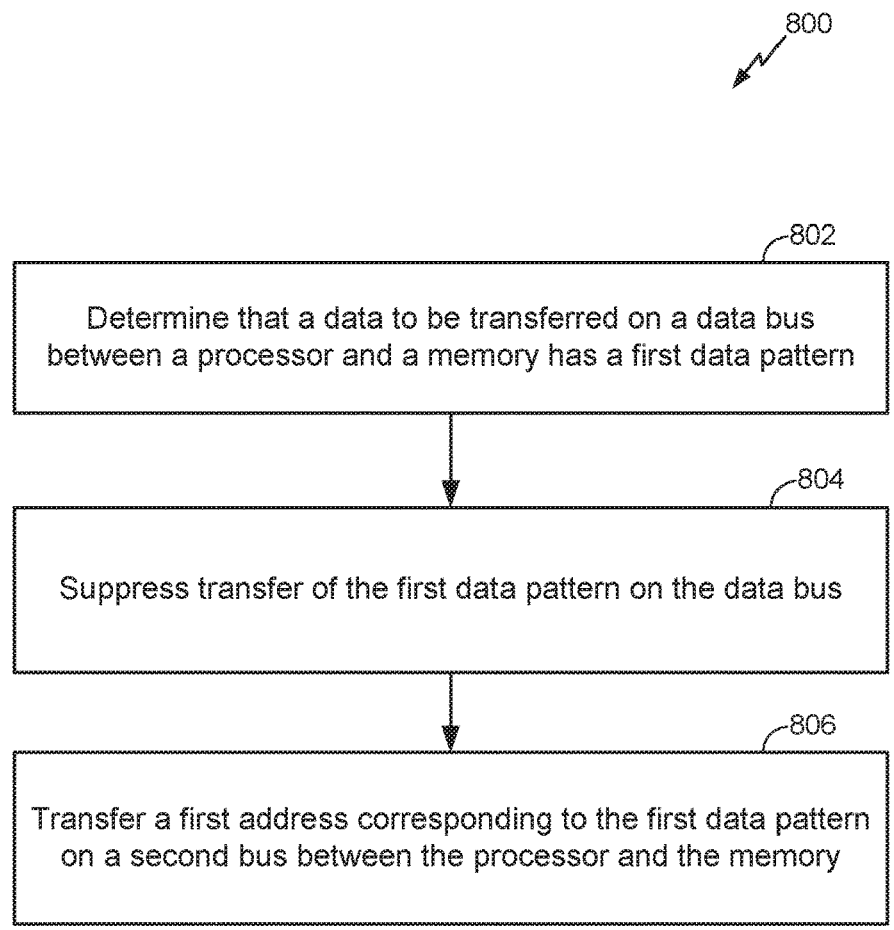
FIG. 8 illustrates a flow chart pertaining to method of communication, according to exemplary aspects of this disclosure.

It will be appreciated that aspects include various methods for performing the processes, functions and/or algorithms disclosed herein. FIGS. 6-8 illustrate various exemplary methods of this disclosure, as explained in detail below.

Considering FIG. 6, method 600 for a write operation is explained. In block 602, memory controller 208 receives a 2*n-bit data from one of processing elements 204a-c and generates a 2*n-bit write data to be sent to memory subsystem 230, for example, stores it in register 506. In decision block 604, it is determined if the new data creates a need for updating write data FIFO policy management 242c as discussed with reference to FIG. 5 (e.g., to replace an entry of write data FIFO 242a using pattern scores in fields 510a-y). If not (i.e., the "no" path is followed from decision block 604), in block 606, the data in register 506 is checked against entries 504a-x for a match, e.g., in write data temporal pattern checker 242b. In decision block 608, hit 502 is generated if there is a match, and additionally, if there is a match, it is confirmed in decision block 610 that any policies in write data FIFO policy management 242c are met.

Assuming both decision blocks 608 and 610 follow the "yes" path, then in block 622, memory controller 208 may issue a "no data transfer write command with FIFO tag" to send the tag of the matching entry 504a-x rather than the matching data pattern to memory subsystem 230. In block 624, memory subsystem 230 reads data in corresponding write data FIFOs 252a-b or 254 to be written to a corresponding address in memory banks 216.

If either one of decision blocks 608 or 610 result in a "no" path, then block 618 is reached where memory controller 208 issues a normal write command (i.e., without suppression) and in block 620, memory subsystem 230 completes a write operation with data received from buses 212a-b.

If the "yes" path is followed from decision block 604, then block 612 is reached where a new write data pattern is pushed into one of entries 504a-x of write data FIFO 242a and in block 614 (e.g., as discussed with reference to FIG. 5 using pattern scores 510a-y), memory controller 208 issues a corresponding "write command with FIFO tag update" to inform corresponding write data FIFOs 252a-b or 254 in memory subsystem 230 about the tag at which the new write data pattern is to be pushed into in write data FIFO 242a. Following this, in block 616, the write operation for the new write data pattern is carried out in a conventional manner with the new write data pattern sent on data buses 212a-b, and additionally, write data FIFOs 252a-b or 254 push the new write data pattern at a location indicated by the tag received in block 614.

With reference now to FIG. 7, method 700 for a read operation is explained. In block 702, memory controller 208 issues a read command and corresponding read address to memory subsystem 230, e.g., via bus 214. In block 704, the read operation is performed by reading data from the read address at corresponding memory banks 216. In block 706, the read data is compared with write data FIFOs 252a-b or 254, by read data pattern checker 262a-b or 272, respectively. In decision block 708, if read data pattern checker 262a-b or 272 detect a match in corresponding write data FIFOs 252a-b or 254, then the "yes" path is followed to block 710, where the tag where the match was detected is sent from memory subsystem 230 to SoC 220 through back channel 264 (or a partial use of buses 212a-b) without corresponding transfer of read data on buses 212a-b. In block 712, memory controller 208 extracts the read data from write data FIFO 242a from the location specified by the tag. If the "no" path is followed from decision block 708, i.e., there is no match, then a normal read operation is performed where the read data is transferred on buses 212a-b from memory subsystem 230.

With reference now to FIG. 8, method 800 will be discussed. In various aspects, method 800 may generally be directed to communication in a processing system (e.g., processing system 200) and may involve method 600 and/or method 700 discussed above. The processing system may comprise a processor integrated on a system on a chip (SoC) and a memory integrated on a second chip comprising a memory subsystem.

For example, in block 802, method 800 may comprise determining that a data to be transferred on a data bus (e.g., buses 212a-b) between a processor and a memory (e.g., a write data from SoC 220 to memory subsystem 230 or a read data from memory subsystem 230 to SoC 220) has a first data pattern (e.g., a predetermined data pattern comprising all zeros or all ones). Block 804 comprises suppressing transfer of the first data pattern on the data bus and, and block 806 comprises transferring a first address corresponding to the first data pattern (e.g., a tag of a FIFO entry of a processor-side first-in-first-out (FIFO) such as write data FIFO 242a on SoC 220 or a tag of a FIFO entry of a memory-side FIFO such as write data FIFOs 252a-b/254 of memory subsystem 230) on a second bus (e.g., control bus 214 or back channel 264) between the processor and the memory, wherein the first address is smaller than the first data pattern.

In some aspects, transfer of the first data pattern in block 806 is from the processor to the memory, which comprises reading the first data pattern from the first address in the memory-side FIFO and writing the first data pattern to a memory bank (e.g., memory bank 216) in the memory wherein the memory-side FIFO (e.g., write data FIFOs 252a-b) is located at an input/output port (e.g., IO blocks 213a-b) of the memory or the memory-side FIFO (e.g., write data FIFO 254) is located within a decoder block (e.g., decoder and latch 218) of the memory bank; wherein block 806 further comprises checking the memory-side FIFO for the first data pattern for a read operation initiated by the processor.

In some aspects, transfer of the first data pattern in block 806 is from the memory to the processor, which comprises reading the first data pattern from the first address in the processor-side FIFO, checking the processor-side FIFO for the first data pattern for a write operation initiated by the processor, and if the first data pattern is not present in the processor-side FIFO, adding the first data pattern to a second address in the processor-side FIFO, transferring the first data pattern on the data bus and the second address on the second bus, and adding the first data pattern to the second address of the memory-side FIFO (e.g., as discussed in methods 600, 700).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for accessing a DRAM array and performing low power self-correction by integrating a self-correction operation within a self-refresh cycle. Accordingly, the invention is not limited to illustrated examples and any means for performing the functionality described herein are included in aspects of the invention.

Figure 9:
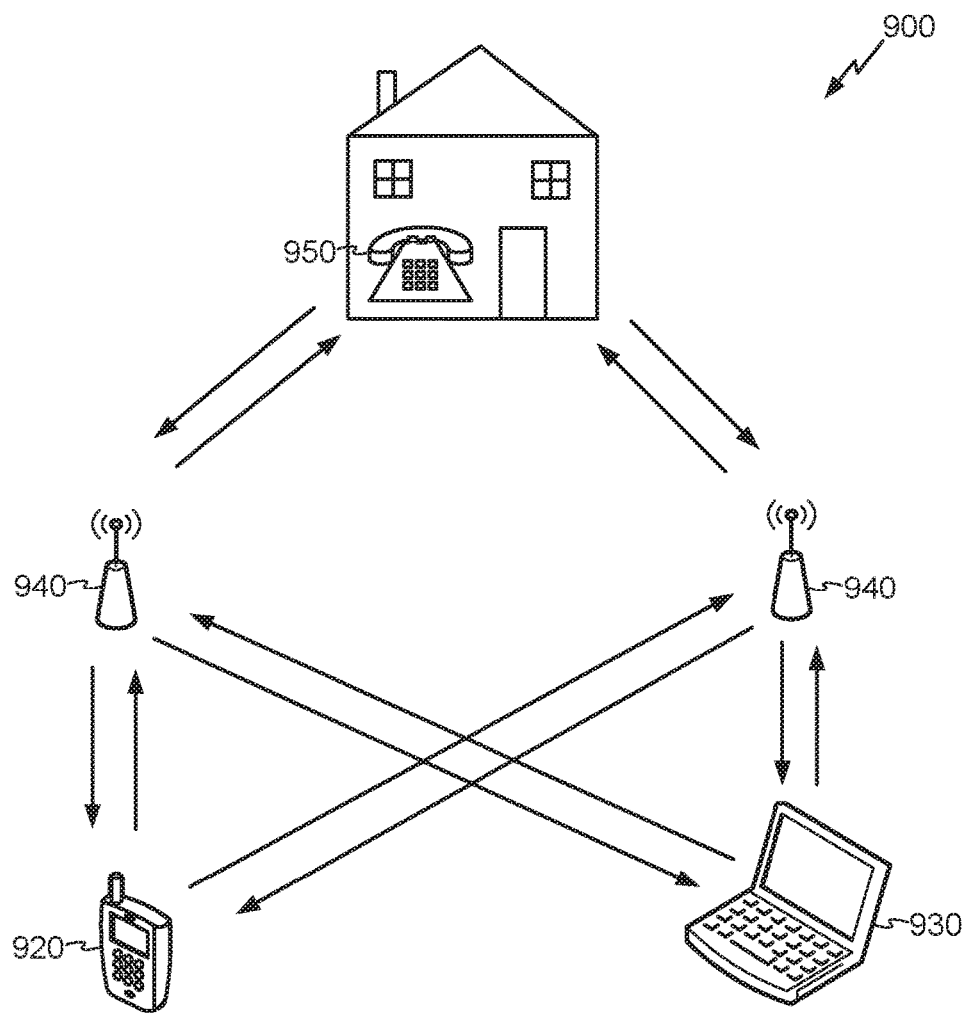
FIG. 9 is a block diagram showing an exemplary wireless communication system in which aspects of the disclosure may be advantageously employed.

FIG. 9 illustrates an exemplary wireless communication system 900 in which an aspect of the disclosure may be advantageously employed. For purposes of illustration, FIG. 9 shows three remote units 920, 930, and 950 and two base stations 940. In FIG. 9, remote unit 920 is shown as a mobile telephone, remote unit 930 is shown as a portable computer, and remote unit 950 is shown as a fixed location remote unit in a wireless local loop system. For example, the remote units may be mobile phones, hand-held personal communication systems (PCS) units, portable data units such as personal data assistants, GPS enabled devices, navigation devices, settop boxes, music players, video players, entertainment units, fixed location data units such as meter reading equipment, or any other device that stores or retrieves data or computer instructions, or any combination thereof. Although FIG. 9 illustrates remote units according to the teachings of the disclosure, the disclosure is not limited to these exemplary illustrated units. Aspects of the disclosure may be suitably employed in any device which includes active integrated circuitry including memory and on-chip circuitry for test and characterization.

The foregoing disclosed devices and methods are typically designed and are configured into GDSII and GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of communication in a processing system, the method comprising:
   determining that a data to be transferred on a data bus between a processor and a memory has a first data pattern;
   suppressing transfer of the first data pattern on the data bus; and
   transferring a first address corresponding to the first data pattern on a second bus between the processor and the memory.

2. The method of claim 1,
   wherein the processor comprises a processor-side first-in-first-out (FIFO) and the memory comprises a memory-side FIFO,
   wherein the first data pattern is present at the first address in the processor-side FIFO and at the first address in the memory-side FIFO.

3. The method of claim 2, wherein for a transfer of the first data pattern from the processor to the memory, reading the first data pattern from the first address in the memory-side FIFO and writing the first data pattern to a memory bank in the memory.

4. The method of claim 3, wherein the memory-side FIFO is located at an input/output port of the memory.

5. The method of claim 3, wherein the memory-side FIFO is located within a decoder block of the memory bank.

6. The method of claim 3, comprising checking the memory-side FIFO for the first data pattern for a read operation initiated by the processor.

7. The method of claim 3, wherein the second bus is a back channel from the memory to the processor or a portion of the data bus.

8. The method of claim 2, wherein for a transfer of the first data pattern from the memory to the processor, reading the first data pattern from the first address in the processor-side FIFO.

9. The method of claim 8, comprising checking the processor-side FIFO for the first data pattern for a write operation initiated by the processor.

10. The method of claim 8, comprising, if the first data pattern is not present in the processor-side FIFO, adding the first data pattern to a second address in the processor-side FIFO, transferring the first data pattern on the data bus and the second address on the second bus, and adding the first data pattern to the second address of the memory-side FIFO.

11. The method of claim 8, wherein the second bus is a control bus.

12. The method of claim 1, wherein the processor is integrated on a system on a chip (SoC) and the memory is integrated on a second chip comprising a memory subsystem.

13. The method of claim 1, wherein the first address is smaller than the first data pattern.

14. The method of claim 1, wherein the first data pattern is a predetermined data pattern comprising all zeros or all ones.

15. An apparatus comprising:
a processor;
a memory;
a data bus between the processor and the memory;
a data pattern checker configured to determine that a data to be transferred on the data bus has a first data pattern and suppress transfer of the first data pattern on the data bus; and
a second bus configured to transfer a first address corresponding to the first data pattern between the processor and the memory.

16. The apparatus of claim 15,
wherein the processor comprises a processor-side first-in-first-out (FIFO) and the memory comprises a memory-side FIFO,
wherein the first data pattern is present at the first address in the processor-side FIFO and at the first address in the memory-side FIFO.

17. The apparatus of claim 16, wherein for a transfer of the first data pattern from the processor to the memory, the data pattern checker is a write data pattern checker and the first data pattern is read from the first address in the memory-side FIFO and written to a memory bank in the memory.

18. The apparatus of claim 17, wherein the memory-side FIFO is located at an input/output port of the memory.

19. The apparatus of claim 17, wherein the memory-side FIFO is located within a decoder block of the memory bank.

20. The apparatus of claim 17, wherein the data pattern checker is a read data pattern checker configured to check the memory-side FIFO for the first data pattern for a read operation initiated by the processor.

21. The apparatus of claim 17, wherein the second bus is a back channel from the memory to the processor or a portion of the data bus.

22. The apparatus of claim 17, wherein for a transfer of the first data pattern from the memory to the processor, the first data pattern is read from the first address in the processor-side FIFO.

23. The apparatus of claim 22, wherein the data pattern checker is a write data pattern checker configured to check the processor-side FIFO for the first data pattern for a write operation initiated by the processor.

24. The apparatus of claim 23 further comprising a write data FIFO policy management block configured to add the first data pattern to a second address in the processor-side FIFO if the first data pattern is not present in the processor-side FIFO and,
wherein the first data pattern is transferred on the data bus and the second address is transferred on the second bus, and the first data pattern is added to the second address of the memory-side FIFO.

25. The apparatus of claim 23, wherein the second bus is a control bus.

26. The apparatus of claim 15, wherein the processor is integrated on a system on a chip (SoC) and the memory is integrated on a second chip comprising a memory subsystem.

27. The apparatus of claim 15, wherein the first address is smaller than the first data pattern.

28. The apparatus of claim 15, wherein then first data pattern is a predetermined data pattern comprising all zeros or all ones.

29. An apparatus comprising:
means for determining that a data to be transferred on a data bus between a processor and a memory has a first data pattern;
means for suppressing transfer of the first data pattern on the data bus; and
means for transferring a first address corresponding to the first data pattern on a second bus between the processor and the memory.

30. The apparatus of claim 29, comprising means for reading the first data pattern from the first address of a memory-side first-in-first-out (FIFO) located in the memory and means for writing the first data pattern to a memory bank in the memory and means for reading the first data pattern from the first address of a processor-side first-in-first-out (FIFO) located in the processor, wherein the first data pattern is present at the first address of the memory-side FIFO and the processor-side FIFO.

31. A processing system comprising:
a system on chip (SoC) comprising at least one processor;
a storage memory package comprising at least one storage memory die;
a storage memory link between the SoC and the storage memory package;
a write data temporal pattern checker configured to determine that a data to be transferred on a transmission link of the storage memory link between the SoC and the storage memory package has a first data pattern and suppress transfer of the first data pattern on the transmission link; and
a first storage memory interface of the SoC configured to transfer a first address corresponding to the first data pattern on the transmission link.

32. The processing system of claim 31,
wherein the SoC comprises a processor-side first-in-first-out (FIFO) and the storage memory package comprises a memory-side FIFO,
wherein the first data pattern is present at the first address in the processor-side FIFO and at the first address in the memory-side FIFO.

33. The processing system of claim 32,
wherein the storage memory package further comprises a second storage memory interface configured to receive the first address and provide the first address to a storage memory controller comprising the memory-side FIFO,
wherein the storage memory controller is configured to retrieve the first data pattern from the first address at the memory-side FIFO and transfer the first data pattern to be written to a storage memory die of the storage memory package.

34. The processing system of claim 32, wherein the storage memory package further comprises
a read data temporal pattern checker configured to determine that a data to be transferred on a reception link of the storage memory link between the storage memory package and the SoC has a second data pattern and suppress transfer of the second data pattern on the reception link; and
a second storage memory interface of the storage memory package is configured to transfer a second address corresponding to the second data pattern on the transmission link, wherein the second data pattern is present at the second address in the processor-side FIFO and at the second address in the memory-side FIFO.

* * * * *